July 29, 1952 R. A. MILLHOLLAND ET AL 2,604,800
METAL WORKING TOOL
Filed Nov. 4, 1946 2 SHEETS—SHEET 2
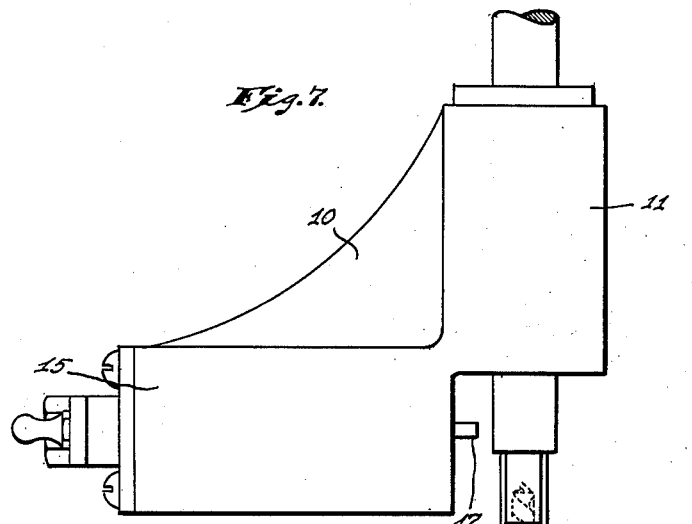
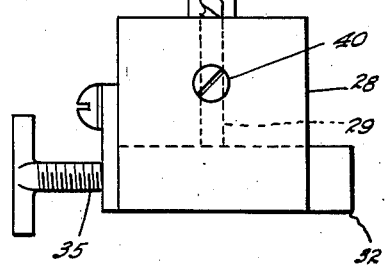
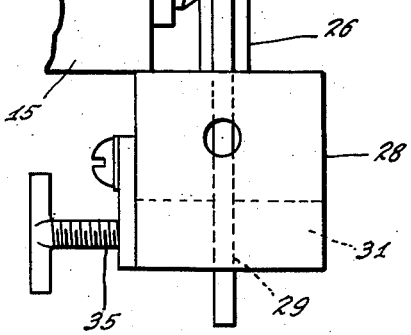
INVENTORS
RAYMOND A. MILLHOLLAND
AND
BY ERNEST MILLHOLLAND,
ATTORNEYS.

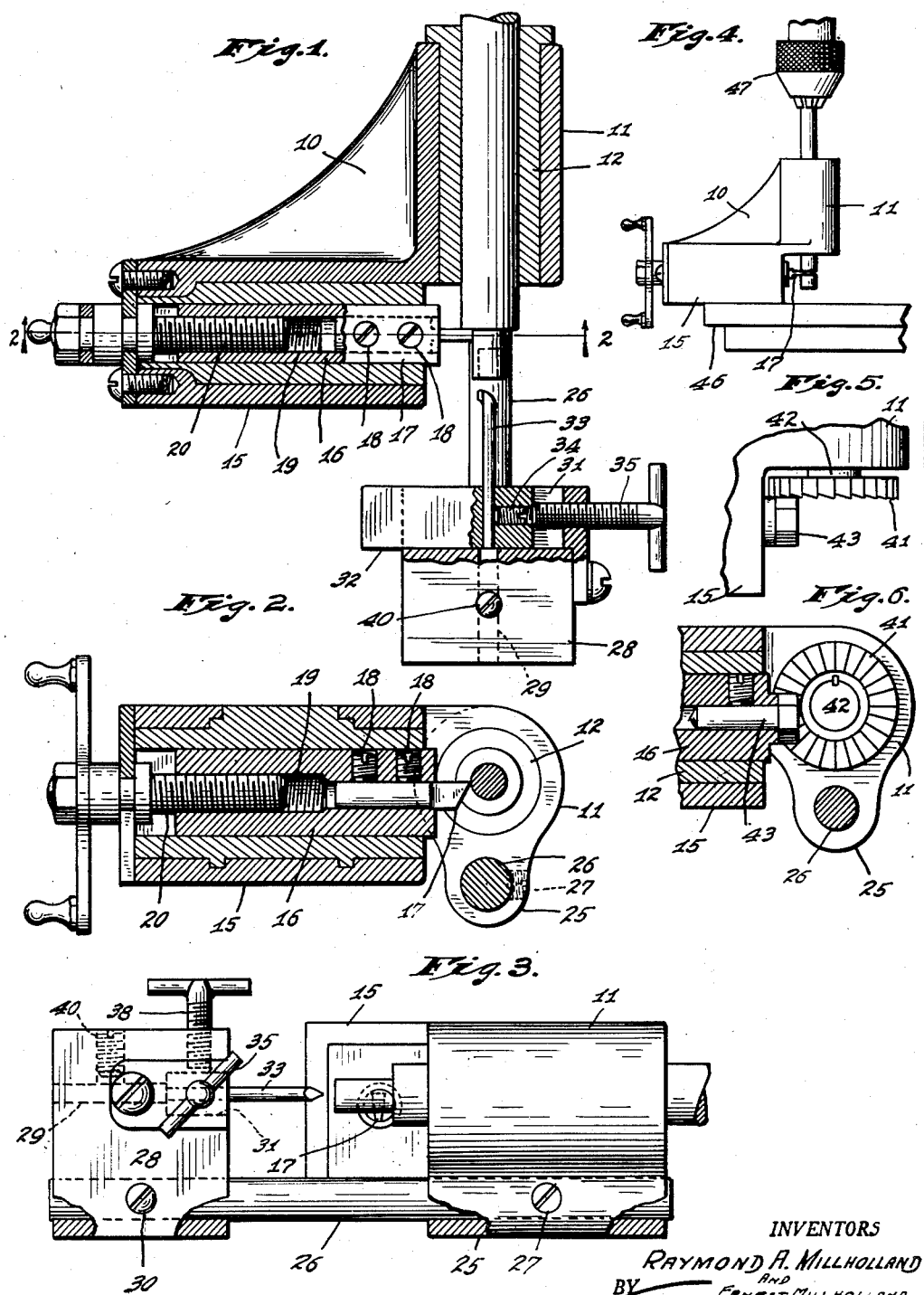

Patented July 29, 1952

2,604,800

UNITED STATES PATENT OFFICE 2,604,800

METAL WORKING TOOL

Raymond A. Millholland and Ernest Millholland, Indianapolis, Ind.

Application November 4, 1946, Serial No. 707,606

1 Claim. (Cl. 77—4)

This invention relates to a metal-working tool and has for its principal object the production of a simple and inexpensive tool which can be used to perform, on relatively light bar stock and without placing the work on centers, many operations such as are customarily performed in a lathe or milling machine. Other objects of a more detailed character will become apparent from the following description of the invention.

In carrying out the invention, we employ a frame having a cylindrical opening of considerable axial extent adapted to receive rotatably the stock which is to be machined. Such frame carries a laterally projecting arm in which there is mounted for radial sliding movement a cross slide adapted to carry a metal-working tool at its inner end. Associated with the arm we provide a means for adjusting and controlling the position of the cross-slide. The frame is provided in addition to the arm with a longitudinally extending member, preferably removable, which is disposed parallel to but spaced from the stock-receiving opening and which is adapted to support in line with the stock a support for a drill or adjustable boring bar. In the operation of the device, it is supported and positioned by the engagement of the stock in the stock-receiving opening, the stock being rotated in any convenient manner as by securing it in the chuck of a drill press, breast drill, lathe, or bit-brace or in any other appropriate work-rotating means.

The accompanying drawings illustrate our invention: Fig. 1 is a plan view of the device with portions broken away to illustrate the construction more clearly; Fig. 2 is a transverse section on the line 2—2 of Fig. 1; Fig. 3 is a side elevation of the device; Fig. 4 is a view illustrating the manner in which the device can be employed to perform a metal-turning or cut-off operation in an ordinary drill press; Figs. 5 and 6 are fragmental views similar to Figs. 1 and 2 illustrating the use of the device in the performance of a milling operation; Fig. 7 is a view similar to Fig. 1 illustrating another use of the device; and Fig. 8 is a view similar to Fig. 1 illustrating a further use of the device.

As will be clear from Fig. 1, the device embodies a frame 10 provided with a bearing portion 11 adapted to receive the bar stock which is to be machined. By providing for the bearing portion 11 a set of alternatively usable bushings 12 having the same external diameter but varying internal diameters, the device may be adapted to operate on bars of different diameters. If stock of polygonal or other non-circular cross section is to be machined, a bushing having an appropriately shaped central opening may be employed. If the stock is polygonal in cross section, it is of course essential that the bushing be rotatable in the bearing; but where round stock is to be used, it is immaterial whether or not the bushing 12 is free to rotate in the bearing.

Adjacent one end of the bearing 11, the frame is provided with a laterally extending arm 15 in which a cross-slide 16 is received for sliding movement radially of the bearing 11. At its inner end, the cross slide 16 is provided with a longitudinally extending opening for the reception of a tool bit 17 and with one or more set screws 18 or other means for holding such tool bit in position. The outer end of the slide 16 is provided with a screw-threaded recess 19 which receives an adjusting screw 20 secured in any appropriate manner in fixed position axially of itself relative to the arm 15.

At a point radially displaced from the arm 15, the bearing 11 is provided with a longitudinally extending boss 25 provided with a longitudinally extending opening in which a bar 26 is adapted to be removably received. A set screw 27 or equivalent means is provided to secure the bar 26 in position. Beyond the arm 15, there is mounted on the bar 26 a support 28, conveniently a block of metal. The support 28 is provided with an opening 29 extending through it parallel to the bar 26 and spaced therefrom a distance equal to the distance between the axis of such bar and the axis of the bearing 11, so that by properly positioning the support 28 about the axis of the bar 26 the opening 29 may be made coaxial with the bearing 11. A set screw 30, or equivalent, may be employed to secure the support 28 in any position of adjustment about the axis of the bar 26.

Across the axially presented face of the support 28 there extends a slot 31 adapted to receive slidably a slide 32 having a transverse opening for the reception of a boring bar 33 which is secured in position in the slot as by means of a set screw 34. An adjusting screw 35 is mounted in the support 28 in position to bear against one end of the slide 32 to locate it radially with relation to the bearing 11 and thus to determine the diameter of any hole bored by the boring bar 33 in the end of stock supported in the bearing 11.

Depending upon the type of work to be performed, the device may be used either with or without the support 28 in position. For most turning operations, it will be convenient if the support 28 and bar 26 are removed from association with the frame 10. The tool bit 17 supported in the cross slide 16 may be of any of the forms commonly used in metal-turning operations, the cut-off tool illustrated in Fig. 1 being shown merely as an example. For reducing the diameter of bar stock, it will of course be understood that an appropriately ground metal-turning bit will be employed.

In performing a turning or other external operation on a piece of bar stock, a bushing 12 is first selected and placed in the bearing 11. A suitable tool bit is inserted and secured in the slide 16, and such slide is adjusted by operation of the screw 20 to set the tool to turn the stock to the desired radius. The stock is then fed through the opening in the bushing 12 while it and the frame 10 are being rotated relatively to each other. The method by which such relative rotation is obtained is entirely immaterial. For example, the stock may be mounted in the chuck of a drill press, breast drill, or bit brace, or it may be secured in the chuck or collet of a lathe, if a lathe is available. Alternatively, the stock may be held stationary, as in a vise, while the frame 10 is rotated about it manually. By appropriate adjustment of the slide 16, stock supported in the bushing 12 may be turned to any desired diameter.

To sever a turned piece of work from the bar stock a cut-off tool, such as that indicated in Fig. 1, may be employed, the stock and frame 10 being held in fixed axial position relative to the stock as the tool is fed radially by adjustment of the screw 20.

For performing a boring operation, the bar 26 and support 28 are assembled in association with the frame 10 as shown in Figs. 1 and 3. Radial adjustment of the boring bar 33 is obtained through the medium of the adjusting screw 35, and the slide 32, which supports the boring bar, may be locked in any position of radial adjustment by a clamp screw 38. As the slot 31, in which the slide 32 is received, is open, the clamp screw 38 can be released at any time and the slide 32 and boring bar 33 removed to facilitate gauging or calipering the diameter of the hole being bored. If the position of the adjusting screw 35 is not changed, the slide 32 may be reinserted into its original position in the support 28. As in the case of a turning operation, boring is performed by manually feeding the device axially of the stock while the stock and frame 10 are being rotated relatively to each other.

If it is desired to drill the end of the stock, the support 28 is reversed on the bar 26, as indicated in Fig. 7, and the drill is supported concentrically in the opening 29, being held stationary therein as by means of a set screw 40.

Milling operations on small pieces may be performed in the manner indicated in Figs. 5 and 6. There, we have shown a milling cutter 41, in this instance an end milling cutter, mounted on an arbor 42, which is rotatably supported concentric with the bearing 11. The piece to be milled, in this case the hexagonal head of a screw 43, is secured at the inner end of the slide 16. With the slide adjusted to bring the screw-head within the periphery of the cutter 41, and with the cutter and frame being relatively rotated, the frame is moved axially of the cutter until the blank head has been milled to the desired depth. It will be obvious, that other types of milling operations may be performed with the aid of our device. For example, by using a thin cutter or saw in place of the end mill 41, diametrically extending slots can be produced in the head of a screw by mounting the screw at the inner end of the slide 16 and by feeding such slide radially inward.

In Fig. 8, we have illustrated a set-up suitable for use where stock is to be turned to a relatively small diameter for a relatively great extent. In this instance, the support 28 is mounted on the bar 26 with the slot 31 exteriorly disposed, the slide 32 is removed, and the turned stock is supported in the opening 29, through the medium of a bushing disposed in said opening.

To facilitate use of the device in a drill press the outer axially presented face of the arm 15 may be machined plane and normal to the axis of the bearing 11 so that it may rest on the table 46 of the drill press while the stock is supported in the drill-press chuck 47, as indicated in Fig. 4. Similarly, if the axially presented faces of the support 28 are machined plane and normal to the axis of the bearing 11, the support 28, when it is being used, may be rested upon the table of a drill press by which the stock is rotated.

It is to be noted that in all arrangements shown, as well as in others of which the device is capable, the tool is held in proper alignment with the work by the fit of the stock within the bushing 12. This is a decided advantage as it renders immaterial any misalignment between the stock and the axis about which it is rotated. Further, by supporting the tool directly from the bearing we eliminate any chatter resulting from lost-motion in the bearings of the spindle by which the work is rotated. In turning multi-diameter work, or in producing work which is both turned and bored, all diameters will be accurately concentric both with each other and with the unturned stock.

We claim as our invention:

A metal-working device, comprising a bearing having an elongated bore adapted to receive and to be supported by a bar to be machined, a member supported from said bearing in radially spaced relation to the bearing-axis and extending from the bearing in a direction parallel to the bearing-axis, a tool-support mounted on said member in spaced relation to the bearing, said tool support being provided on the side facing said bearing with an open groove extending radially of the bearing-axis, a radially adjustable slide in said groove, an adjustable abutment carried by said tool-support to locate said slide, and means for clamping the slide in any position of radial adjustment, said slide being provided with means for supporting a boring bar and being removable from said groove by movement toward the bearing.

RAYMOND A. MILLHOLLAND.
ERNEST MILLHOLLAND.

REFERENCES CITED

The following references are of record in the file of this patent:

UNITED STATES PATENTS

| Number | Name | Date |
|---|---|---|
| 351,291 | Stehli | Oct. 19, 1886 |
| 655,095 | Land | July 31, 1900 |
| 1,240,221 | Katzmarek | Sept. 18, 1917 |
| 2,155,573 | Wells | Apr. 25, 1939 |
| 2,341,277 | Larsson | Feb. 8, 1944 |
| 2,367,414 | Mansfield | Jan. 16, 1945 |
| 2,404,433 | Christman | July 23, 1946 |
| 2,417,936 | Klema et al. | Mar. 25, 1947 |
| 2,441,533 | Montgomery | May 11, 1948 |